(12) United States Patent
Bhattacharya

(10) Patent No.: US 10,769,369 B2
(45) Date of Patent: *Sep. 8, 2020

(54) CORRELATING DISTINCT EVENTS USING LINGUISTIC ANALYSIS

(71) Applicant: MICROSOFT TECHNOLOGY LICENSING, LLC, Redmond, WA (US)

(72) Inventor: Pamela Bhattacharya, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 56 days.

This patent is subject to a terminal disclaimer.

(21) Appl. No.: 15/960,791

(22) Filed: Apr. 24, 2018

(65) Prior Publication Data

US 2018/0239752 A1  Aug. 23, 2018

Related U.S. Application Data

(63) Continuation of application No. 15/131,051, filed on Apr. 18, 2016, now Pat. No. 9,984,060.

(51) Int. Cl.
*G06F 40/20* (2020.01)
*G06F 40/226* (2020.01)
(Continued)

(52) U.S. Cl.
CPC .......... *G06F 40/226* (2020.01); *G06F 40/216* (2020.01); *G06Q 30/016* (2013.01); *G08B 21/182* (2013.01)

(58) Field of Classification Search
USPC ....................................................... 704/7–10
See application file for complete search history.

(56) References Cited

U.S. PATENT DOCUMENTS 7,493,518 B2   2/2009  Anderson et al.
8,301,613 B2  10/2012  Grabamik et al.
(Continued)

FOREIGN PATENT DOCUMENTS

WO   2013149892 A1   10/2013

OTHER PUBLICATIONS

"Region District Security in KorWeb", Published on: Jun. 25, 2013, Available at: http:/www.korterra.com/ticket-management/korweb/region-district-security.

(Continued)

*Primary Examiner* — Leonard Saint Cyr
(74) *Attorney, Agent, or Firm* — Michael Best & Friedrich LLP

(57) ABSTRACT

Linguistic analysis based correlation of distinct events is provided. In examples, trouble shooting tickets may be received over a time period. A linguistic analysis may be performed on one or more portions of the one or more comments using a linguistic model and a similarity score may be computed for one or more keywords within the one or more portions of the one or more comments based on criteria associated with each of the keywords. The similarity score for each of the keywords may be compared to a validation threshold and if the similarity score for a subset of the keywords within a trouble shooting ticket exceeds the validation threshold, the trouble shooting ticket may be validated as associated with the incident. If a number of trouble shooting tickets are validated as being associated with the incident exceeds a service outage threshold, an alert may be issued for the service outage.

20 Claims, 7 Drawing Sheets

(51) Int. Cl.
  *G08B 21/18*   (2006.01)
  *G06Q 30/00*   (2012.01)
  *G06F 40/216*  (2020.01)

(56) References Cited

U.S. PATENT DOCUMENTS

| | | | |
|---|---|---|---|
| 8,892,539 | B2 | 11/2014 | Anand et al. |
| 9,299,031 | B2 | 3/2016 | Jan et al. |
| 9,317,829 | B2 | 4/2016 | Anand et al. |
| 2009/0313219 | A1 | 12/2009 | Gupta et al. |
| 2010/0082620 | A1 | 4/2010 | Jennings et al. |
| 2013/0159427 | A1 | 6/2013 | Jahr et al. |
| 2013/0198116 | A1 | 8/2013 | Bhamidipaty et al. |
| 2013/0246972 | A1 | 9/2013 | Tateno |
| 2014/0006861 | A1 | 1/2014 | Jain et al. |
| 2014/0129536 | A1 | 5/2014 | Anand et al. |
| 2014/0146411 | A1 | 5/2014 | Sato et al. |
| 2014/0325254 | A1 | 10/2014 | Mani et al. |
| 2014/0351176 | A1* | 11/2014 | Jan ................... G06N 5/048 706/12 |
| 2015/0006519 | A1 | 1/2015 | Jain et al. |
| 2016/0036655 | A1* | 2/2016 | Burton ............ H04L 41/5029 709/223 |
| 2016/0196501 | A1 | 7/2016 | Anand et al. |
| 2016/0292652 | A1* | 10/2016 | Bowden, Jr. ........ G06Q 10/063 |

OTHER PUBLICATIONS

"Transforming Service Delivery for Hybrid Clouds through Big Data Analytics and Automation", Retrieved on: Jan. 12, 2016 Available at: http://www.informatik.uni-jena.de/dbis/veranstaltungen/zusatzinfo/2015/Kloeckner_Folien .pdf.

"Chapter 7. Service desk, incident & problem management", Published on: Sep. 13, 2014, Available at: https://otrs.github.io/doc/manual/itsm/stable/en/html/ch07.html.

"All Alerts", Retrieved on: Jan. 18, 2016 http://cficluster1opscenter.cloudapp.net/Alert/Details.

Agarwal, et al., "SmartDispatch: Enabling Efficient Ticket Dispatch in an IT Service Environment", In the Proceedings of the 18th ACM SIGKDD International Conference on Knowledge Discovery and Data Mining, Aug. 12, 2012, pp. 1393-1401.

Kang, et al., "A Computer-Facilitated Method for Matching Incident Cases using Semantic", In the Proceedings of International Federation for Information Processing /IEEE International Symposium on Integrated Network Management-Workshops, Jun. 1, 2009, pp. 10-19.

"International Search Report and Written Opinion Issued in PCT Application No. PCT/US2017/026879", dated Jun. 2, 2017, 10 Pages.

Zhou, et al., "Resolution Recommendation for Event Tickets in Service Management", In IFIP/IEEE International Symposium on Integrated Network Management, May 11, 2015, pp. 287-295.

* cited by examiner

CORRELATING DISTINCT EVENTS USING LINGUISTIC ANALYSIS

CROSS REFERENCE TO RELATED APPLICATIONS

This application is a continuation under 35 U.S.C. § 120 of co-pending U.S. patent application Ser. No. 15/131,051 filed on Apr. 18, 2016. The disclosure of the U.S. Patent Application is hereby incorporated by reference in its entirety.

BACKGROUND

Information technology services facilitate the use of technology and provide specialized technology-oriented solutions to end users and enterprises through combining processes and functions of hardware, software, networks, and telecommunications. In some examples, the end users may encounter problems related to a service or a product. The end users may contact the information technology services to address problems or submit requests related to the service or the product. The contact may include a submission of a ticket, for example. Technical support personnel may label each ticket as being related to a problem or an incident. In other examples, the technical support personnel may manually add comments or feedback to the ticket to specify the problem or the request the end user is concerned with.

However, the manual assignment of the ticket to the problem/the incident may be time-consuming, as an accurate and automatic process to map these metrics in near-real time does not exist. Further, in some examples, two technical support personnel may utilize varying keywords in the comments when discussing the same incident, making the classification of the ticket to the incident difficult.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to linguistic analysis based incidence/service outage detection. In some examples, a communication such as a trouble shooting ticket associated with an incident may be received, where the trouble shooting ticket includes a comment. A linguistic analysis may be performed on a portion of the comment, where the linguistic analysis may include determining a parameter associated with a similarity of a keyword within the portion of the comment to a predefined keyword and validating the trouble shooting ticket as associated with the incident through a decision process based on the parameter. Multiple trouble shooting tickets may be analyzed employing the decision process. An alert may be issued for the service outage in response to determining that a number of trouble shooting tickets validated as associated with the incident exceeding a service outage threshold.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
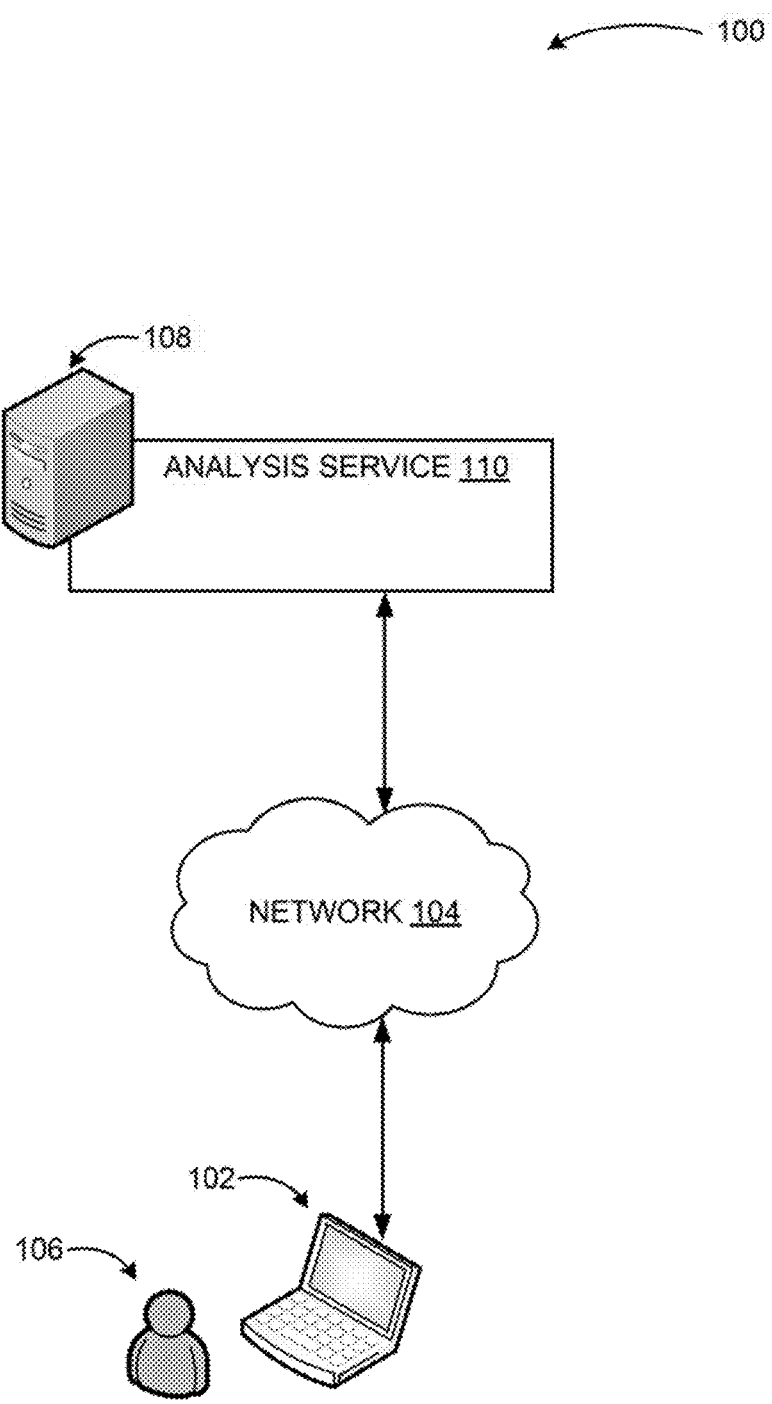
FIG. 1 is a conceptual diagram illustrating an example computing environment for linguistic analysis based correlation of distinct events, according to embodiments.

As briefly described above, embodiments are directed to linguistic analysis based correlation of distinct events. In some examples, a linguistic analysis may be performed on one or more portions of a comment associated with an incident. A similarity score may be computed for keywords related within the comments based on criteria associated with one or more of the keywords. The similarity score for the keywords may be compared to a threshold. In response to detecting the similarity score for a subset of the keywords exceeding the threshold, a communication that includes the comment may be identified and an association between the communication and the incident may be validated.

In some examples, the criteria associated with the keywords may include a first criterion associated with a frequency of contextually-related keywords in the comment and/or a second criterion associated with a usage frequency in the comment, among other criteria. Analyzed portions of the comment may include a sentence or a paragraph in the comment. In additional examples, an analysis service may be configured to assign a first weighted value to the first criterion, assign a second weighted value to the second criterion, and compare the first weighted value to the second weighted value. In other examples, the analysis service may detect the first weighted value as being greater than the second weighted value and may compute the similarity score for keywords related within the comment based on the first criterion associated with the keywords. In further examples, the analysis service may detect the first weighted value as being less than the second weighted value and may subsequently compute the similarity score for the keywords related within the comment based on the second criterion associated with the keywords.

In other examples, trouble shooting tickets in the process of being created may be monitored and linguistic analysis may be performed on an initial portion of a ticket being created (in form of a web form being filled out, an email being sent, etc.). Upon performance of the incident association validation (and optionally service outage detection), the creator of the ticket may be presented with potential solutions and/or suitable people (e.g., administrators, service personnel, etc.) may be alerted prior to the ticket being completed.

In further examples, a support service may present a user that enters a description of a problem with a number of potentially applicable articles or comparable documents. However, in conventional systems, a success rate of such presented documents may not be quantitatively determinable (e.g., did the user find an article useful, did they find another solution, did they give up on the solution) except for user feedback. In one implementation of a system as described herein, a linguistic analysis may be performed on the presented documents. The documents may be selected based on a search prioritization (e.g., keywords). A user action following presentation of the documents and results of the linguistic analysis may then be used to make an inference on the usefulness of the presented documents. For example, the user's action may include creation of a ticket, leaving the support system, etc. If a presented document has a high similarity score, but the user still created a ticket, the inference may be that the content of the document was insufficient to address the problem. On the other hand, if the document's similarity score is low and the user still created a ticket, the inference may be that the document was irrelevant to the user's problem.

In conjunction with embodiments such as the solution relevancy/effectiveness determination described above, various machine learning algorithms may be employed. Some of those may include algorithms that have multiple non-linear layers and can learn feature hierarchies also referred to as "Deep Learning" algorithms. In deep learning systems, algorithms may automatically learn feature hierarchies, which represent objects in increasing levels of abstraction. Deep learning algorithms may be categorized by their architecture (e.g., feed-forward, feed-back, or bi-directional) and training protocols (e.g., purely supervised, hybrid, or unsupervised).

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present disclosure is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for linguistic analysis based correlation of distinct events. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, as used herein, refers to a device comprising at least a memory and one or more processors that includes a server, a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. Actions or operations described herein may be executed on a single processor, on multiple processors (in a single machine or distributed over multiple machines), or on one or more cores of a multi-core processor. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application or service that allow the application or service to interact or communicate with one or more other applications and services managed by separate entities.

While example implementations are described using communications herein, embodiments are not limited to communication data. Linguistic analysis based correlation of distinct events may be implemented in other environments, such as research environments, information technology environments, healthcare environments, educational environments, application sharing environments, online conferencing environments, and similar environments, where communication data may be exchanged. Further examples may include detecting customer impact on service health alerts.

The technical advantages of linguistic analysis based correlation of distinct events may include, among others, an increased accuracy, an increased automation, and a decreased processing time for the assignment of the communication to the incident. For example, a linguistic analysis may be performed on a section of comments associated with the communications. Similarity scores may be computed for each keyword related within the section of the comments based on criteria associated with one or more of the keywords. The use of the linguistic analysis may also reduce processing and network bandwidth usage. Further, the use of the linguistic analysis may reduce human error in the assignment of the communication to the incident.

Embodiments address a need that arises from very large scale of operations created by networked computing and cloud based services that cannot be managed by humans. The actions/operations described herein are not a mere use of a computer, but address results of a system that is a direct consequence of software used as a service such as communication services offered in conjunction with communications.

FIG. 1 is a conceptual diagram illustrating an example computing environment for linguistic analysis based correlation of distinct events, according to embodiments.

As shown in a diagram 100, a server 108 may execute an analysis service 110. The server 108 may include a web server or a document server, among others. The analysis service 110 may receive a communication from a participant 106 (e.g., an end-user, a technical support personnel, etc.) associated with a computing device 102. Examples of the communication may include an instant messaging communication, a textual communication, an email communication, a text message communication, an audio messaging communication, a video messaging communication, and/or a graphical messaging communication, among other forms of communication.

The computing device 102 may communicate with the server 108 through a network 104. The computing device 102 may be a desktop computer, a laptop computer, a tablet, a handheld device, a vehicle mount computer, an embedded computer system, a smart phone, or a wearable computer, among other similar computing devices, for example. The network 104 may provide wired or wireless communications between nodes, such as the computing device 102 or the server 108.

An engine or module (e.g., a processing engine or an analysis engine, for example) of the server 108 may present configuration options on a user experience to the participant 106. The user experience may be a visual display associated with the analysis service 110 through which the participant 106 may interact with the analysis service 110. The interactions may include a touch input, a gesture input, a voice command, eye tracking, a gyroscopic input, a pen input, mouse input, and/or a keyboards input, among others.

The communication may be associated with an incident. The incident may be broadly defined as an abnormal event that is not part of a standard operation of the analysis service 110. In an example, the incident may cause an interruption or a reduction in quality of a product or a service produced by the analysis service 110. In some examples, the incident may include a failure or an error associated with software infrastructure, the network 104, hardware, and/or software. In some examples, the communication may include comments. The comments may be feedback provided by the participant 106 (e.g., the end user, the technical support personnel, etc.).

The analysis service 110 may also be configured to perform a linguistic analysis on a section of the comments or an entirety of the comments. The analysis service 110 may also compute a similarity score for each keyword related within the section of the comments based on criteria associated with the keywords. The similarity score may be a similarity measure or a real-valued similarity function that quantitatively measures a likeness between the keywords related within the section of the comments.

The analysis service 110 may then compare the similarity score for the keywords to a threshold. The threshold may include a timing threshold and/or an urgency threshold associated with the incident. In response to detecting the similarity score for a subset of the keywords exceeding the threshold, the analysis service 110 may identify the communication that includes the comments and may validate an association between the communication and the incident.

The analysis service 110 may implement the process steps described in numerous fields to validate the association between the communication and the incident, such as, the information technology field, the research field, the educational field, and/or the healthcare field, among other examples. In the information technology field, an example communication may include an end-user feedback (e.g., an email feedback) and an example incident may include a service outage in a cloud-based service.

In the research field, the example communication may include the textual communication (e.g., an email feedback) submitted by a student researcher. The example incident may include a service outage associated with a national cloud-based computing center (e.g., the National Institute for Computational Sciences). In the educational field, the example communication may include the textual communication (e.g., an email communication or a press release) submitted by a professor to an information technology department at a college. The example incident may include errors associated with a web-based learning management system (LMS) designed to support online courses or provide a space for face-to-face course supplementation.

In the healthcare field, the example communication may include an audio alert. The audio alert may occur in response to a hospital patient pressing a push button to call a nurse or a doctor. In response to pressing the push button, the audio alert may sound in the patients' hospital room. The example incident may include the patient having a problem breathing.

While the example system in FIG. 1 has been described with specific components including the server 108, the analysis service 110, and the computing device 102, embodiments are not limited to these components or system configurations and can be implemented with other system configuration employing fewer or additional components.

Figure 2:
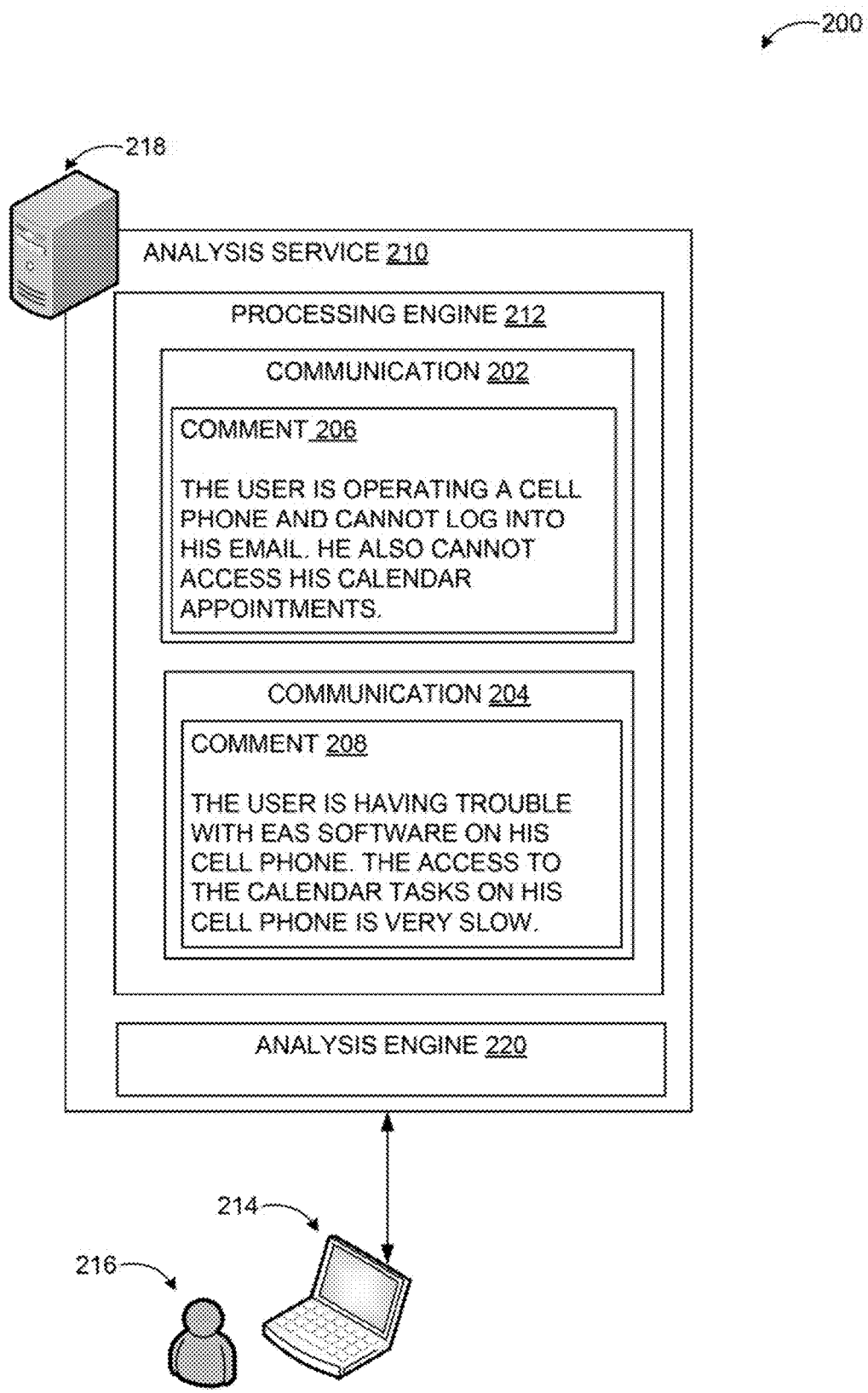
FIG. 2 is a display diagram illustrating an example communication with comments received at a server, according to embodiments, according to embodiments.

FIG. 2 is a display diagram illustrating an example communication with comments received at a server, according to embodiments.

As shown in a diagram 200, a server 218 may execute an analysis service 210. The server 218 may include a web server or a document server, among others. The analysis service 210 may include a processing engine 212 and an analysis engine 220, among others. The processing engine 212 may receive a communication 202 and another communication 204 from a participant 216 associated with a computing device 214. The computing device 214 may communicate with the server 218 through a network.

The communication 202 may include a comment 206. The other communication 204 may include another comment 208. In some examples, the participant 216 (e.g., an end-user) may draft the comment 206 and the other comment 208. In other examples, subsequent receipt of the communication 202 and the other communication 204, the analysis service 210 may prompt the technical support personnel (e.g., engineers, program managers, or escalation engineers, etc.) to draft the comment 206 and the other comment 208. In further examples, the participant 216 may draft the comment 206 associated with the communication 202. Subsequent receipt of the other communication 204, the analysis service 210 may prompt the technical support personnel to draft the other comment 208.

The processing engine 212 may present configuration options on a user experience to the participant 216. The configuration options may include a modification of the communication 202, a modification of the other communication 204, a modification of the comment 206, and/or a modification of the other comment 208. The user experience may be a visual display associated with the analysis service 210 through which the participant 216 may interact with the analysis service 210. The interactions may include a touch input, a gesture input, a voice command, eye tracking, a gyroscopic input, a pen input, mouse input, and/or a keyboards input, among others.

The communication 202 and the other communication 204 may be associated with incidences. In an example, the comment 206 may express the concern that the participant 216 is operating a cell phone, cannot log into his email, and cannot access his calendar appointments. The other comment 208 may express the concern that the participant 216 is having trouble with enterprise application software (EAS) on his cell phone. The other comment 208 may also express the concern that access to the calendar tasks on the participants' cell phone is very slow. Both the comment 206 and the other comment 208 are related to the participant 216 operating the cell phone and having difficulties accessing calendar tasks or appointments, yet the comment 206 and the other comment 208 use different keywords to express similar concerns.

In other examples, the comment 206 and the other comment 208 may use similar keywords to express different concerns aimed at different incidences. For example, the comment 206 may disclose that the participant 216 has recently changed his password and cannot access his email on his cell phone. The other comment 208 may disclose that the participants' email is loading slowly and he cannot access his email on his cell phone. Though the comment 206 and the other comment 208 use similar keywords, such as, "cell phone," "email," and "access," the comment 206 is associated with an inability to access the email on his cell phone subsequent an edit of the participants' password. The other comment 208 is associated with the inability to access the email on his cell phone due to a slow connection.

To remedy the manual classification and association of the communication 202 and the other communication 204 to the incidences, the analysis engine 220 may be configured to perform a linguistic analysis on a section of the comment 206 and the other comment 208. The section may include a sentence, a paragraph, or a participant-defined section of the comment 206 or the other comment 208. The analysis engine 220 may also compute a similarity score for each keyword related within the section of the comment 206 and the other comment 208 based on criteria associated with the keywords. The similarity score may determine a quantitative similarity/likeness measure for each keyword.

Various methods may be used to determine the similarity score. A first method, Term Frequency-Inverse Document Frequency (TF-IDF), is a numerical statistic that identifies how important each keyword is to the document it is included in. TF-IDF has been used in information retrieval and text mining, for example. In the TF-IDF method, the value of a keyword increases proportionally to the number of times the keyword appears in the document, but is offset by the frequency of the keyword in the document, which helps to adjust for the fact that some keywords appear more frequently in general.

Another method that may be used to determine the similarity score may include statistical language models. The statistical language models may assign probability distributions over sequences of keywords. For example, with a sequence of keywords of a length m, a statistical language model may assign a probability of $P(w_1, \ldots, w_m)$ to the whole sequence. Having a way to estimate the relative likelihood of different phrases may be useful in natural language processing applications, such as speech recognition, machine translation, part-of-speech tagging, parsing, handwriting recognition, and information retrieval, among other applications.

The analysis engine 220 may also compare the similarity score for the keywords to a threshold. The threshold may include a timing threshold (e.g., a twenty-four hour threshold, an hour threshold, or a ten minute threshold, etc.) and/or an urgency threshold associated with the incident. In some examples, the urgency threshold may be participant-defined or may be system-dependent.

In response to detecting the similarity score for a subset of the keywords exceeding the threshold, the analysis engine 220 may identify a select communication (e.g., the communication 202) that includes the comment 206 and may validate an association between the communication 202 and the incident.

Figure 3:
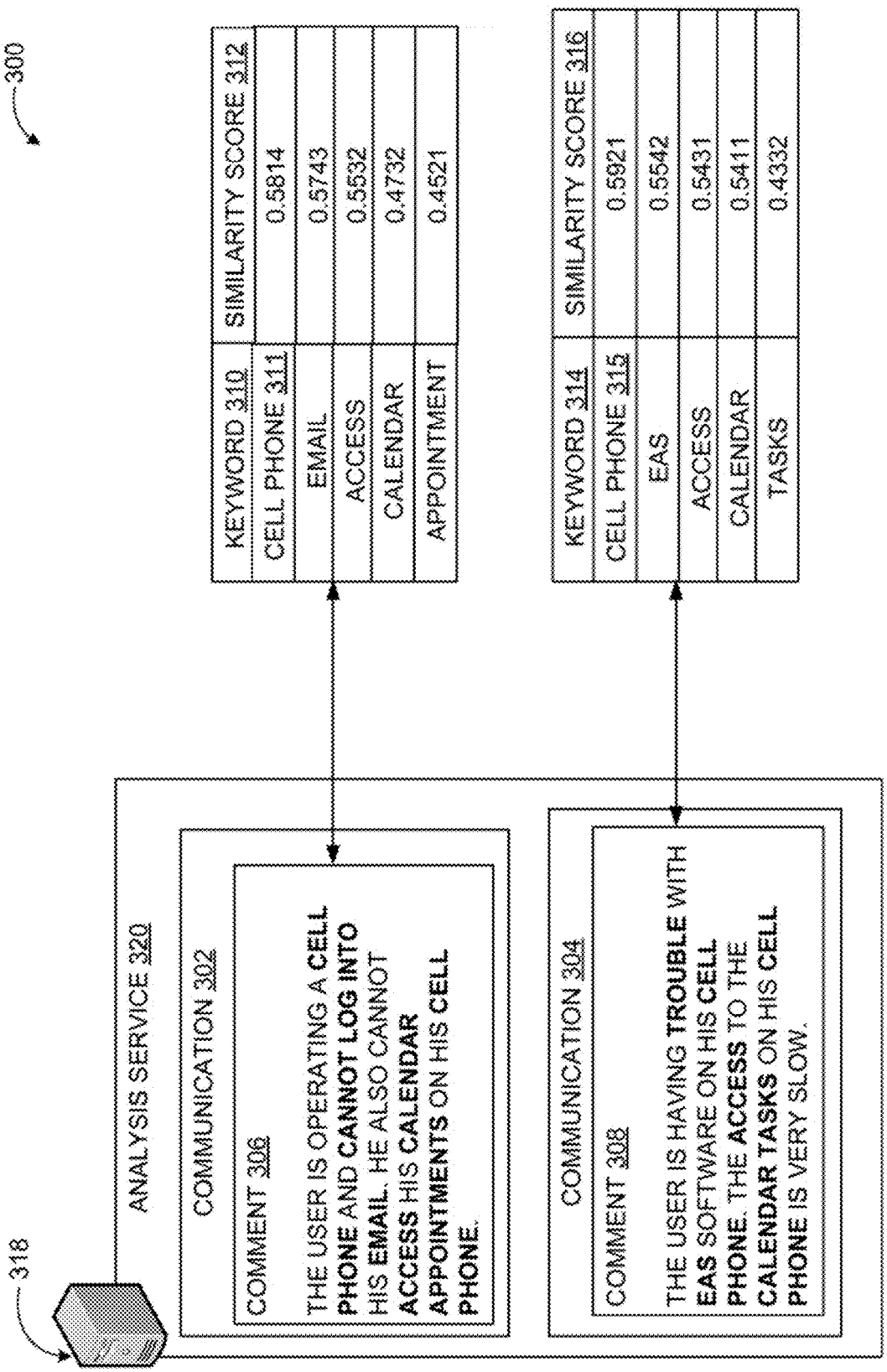
FIG. 3 is a display diagram illustrating performance of a linguistic analysis on comments to extract keywords associated with each of the comments and computing a similarity score for each of the keywords, according to embodiments.

FIG. 3 is a display diagram illustrating performance of a linguistic analysis on comments to extract keywords associated with each of the comments and computing a similarity score for the keywords, according to embodiments.

As shown in a diagram 300, a server 318 may execute an analysis service 320. The analysis service 320 may receive a communication 302 and another communication 304 from a participant. The communication 302 may include a comment 306. The other communication 304 may include a comment 308. In an example, the communication 302 and the other communication 304 may be associated with the same incident. In other examples, the communication 302 and the other communication 304 may be associated with different incidences.

In an example, the comment 306 may express the concern that the participant is operating a cell phone, cannot log into his email, and cannot access his calendar appointments. The comment 306 may include keywords 310 such as, "cell phone" 311, "email," "access," "calendar," and "appointment." The comment 308 may express the concern that the participant is having trouble with enterprise application software (EAS) on his cell phone. The comment 308 may also disclose that the participant's access to the calendar tasks on his cell phone is very slow. The comment 308 may include the keywords 314 such as, "EAS," "access," "calendar," "tasks," and "cell phone 315." Both the comment 306 and the comment 308 are related to the participant operating the cell phone and having difficulties accessing calendar tasks or appointments, yet the comment 306 and the comment 308 may use different keywords to express similar concerns.

The analysis service 320 may be configured to perform a linguistic analysis on a section of the comment 306. The section of the comment 306 may include a sentence in the comment 306, a paragraph in the comment 306, and/or a participant-defined area in the comment 306, among others. In some examples, the analysis service 320 may be configured to perform a linguistic analysis on the entirety of the comment 306 and/or the entirety of the comment 308.

The analysis service 320 may also compute a similarity score 312 for each keyword related within the section of the comment 306 based on criteria associated with the keywords 310. One or more machine learning algorithms may be used to determine the keywords 310 related during a time period. For example, during a first time period, the keywords 310, "mailbox," "archive," and "account," may be associated within the comment 306 more often than not (e.g., six out of ten sampling times, seven out of ten sampling times, eight out of ten sampling times, etc.). The analysis service 320 may determine that the keywords 310, "mailbox," "archive," and "account" are related during a second time period.

The machine learning techniques may include pattern recognition and computational learning theory, among others. The machine learning algorithms may learn and make predictions on the communication data of the communication 302 and the other communication 304. Common machine learning algorithms may include supervised learning algorithms, unsupervised learning algorithms, and reinforcement learning algorithms. Some of the machine learning algorithms may include linear regression algorithms, logistic regression algorithms, decision tree algorithms, support vector machine (SVM) algorithms, Naive Bayes algorithms, a K-nearest neighbors (KNN) algorithm, a K-means algorithm, a random forest algorithm, dimensionality reduction algorithms, and a Gradient Boost & Adaboost algorithm, among others.

The supervised learning algorithms may use a dependent variable which is to be predicted from a given set of independent variables. Using the independent variables, a function may be generated that may map inputs to desired outputs. The training process may continue until the model achieves a desired level of accuracy on the training data. Examples of the supervised learning algorithms may include a regression learning algorithm, a decision tree learning algorithm, a random forest learning algorithm, a k-nearest neighbors algorithm, and a logistic regression algorithm, among others.

The unsupervised learning algorithms do not have outcome variables to predict/estimate, but the unsupervised learning algorithms may be used for clustering populations (e.g., the keywords) in different groups. Examples of the unsupervised learning algorithms may include an apriori algorithm and a K-means algorithm, among others. An example reinforcement learning algorithm may include the Markov decision process algorithm.

In some examples, the criteria associated with the keywords may include a first criterion associated with a frequency of contextually-related keywords in the section of the comment 306 and/or a second criterion associated with a usage frequency in the section of the comment 306. The similarity score 312 may determine a quantitative similarity/ likeness measure for each keyword.

In an example, the analysis service 320 may perform the linguistic analysis on the entirety of the comment 306. The analysis service 320 may compute the similarity score 312 for the keywords related within the entirety the comment 306 based on the second criterion (e.g., the usage frequency in the section of the comment 306). In the example, as the keyword, "cell phone" 311 appears twice within the entirety of the comment 306, the analysis service 320 may compute the highest similarity score for the keyword, "cell phone" 311.

In another example, the analysis service 320 may assign a first weighted value (e.g., a weighted value of two) to the first criterion and may assign a second weighted value (e.g., a weighted value of one) to the second criterion. The analysis service 320 may compare the first weighted value to the second weighted value. The analysis service 320 may detect the first weighted value as being greater than the second weighted value and may then compute the similarity score 312 for each keyword related within the section of the comment based on the first criterion associated with the keywords.

In other examples, the analysis service 320 may assign a first weighted value (e.g., a weighted value of one) to the first criterion and may assign a second weighted value (e.g., a weighted value of three) to the second criterion. The analysis service 320 may compare the first weighted value to the second weighted value. The analysis service 320 may detect the first weighted value as being less than the second weighted value and may then compute the similarity score 312 for each keyword related within the section of the comment based on the second criterion associated with the keywords.

In further examples, the analysis service 320 may receive a request from a requesting party to modify the assignment of one the first weighted value to the first criterion and the second weighted value to the second criterion. The analysis service 320 may identify a credential associated with the requesting party and may compare the credential to a predefined rule. In response to detecting a match between the credential and the predefined rule, the analysis service 320 may identify the requesting party as an administrator and may provide an alert to be displayed on a user experience to the requesting party to prompt the requesting party to modify the assignment associated with the first weighted value and/or the second weighted value. The alert may include an audio alert, a visual alert, a tactile alert, and/or a textual alert, among others. The analysis service 320 may then receive the modification of the assignment from the requesting party and may then execute modification of the assignment.

The analysis service 320 may also compare the similarity score 312 for the keywords to a threshold. The threshold may include a timing threshold (e.g., a twenty-four hour threshold, an hour threshold, or a ten minute threshold, etc.) and/or an urgency threshold associated with the incident. In some examples, the urgency threshold may be participant-defined (e.g., may be based on a task or appointment set by the participant). In response to detecting the similarity score 312 for a subset of the keywords exceeding the threshold, the analysis service 320 may identify a select communication (e.g., the communication 302) that includes the comment and may validate an association between the communication 302 and the incident.

Figure 4:
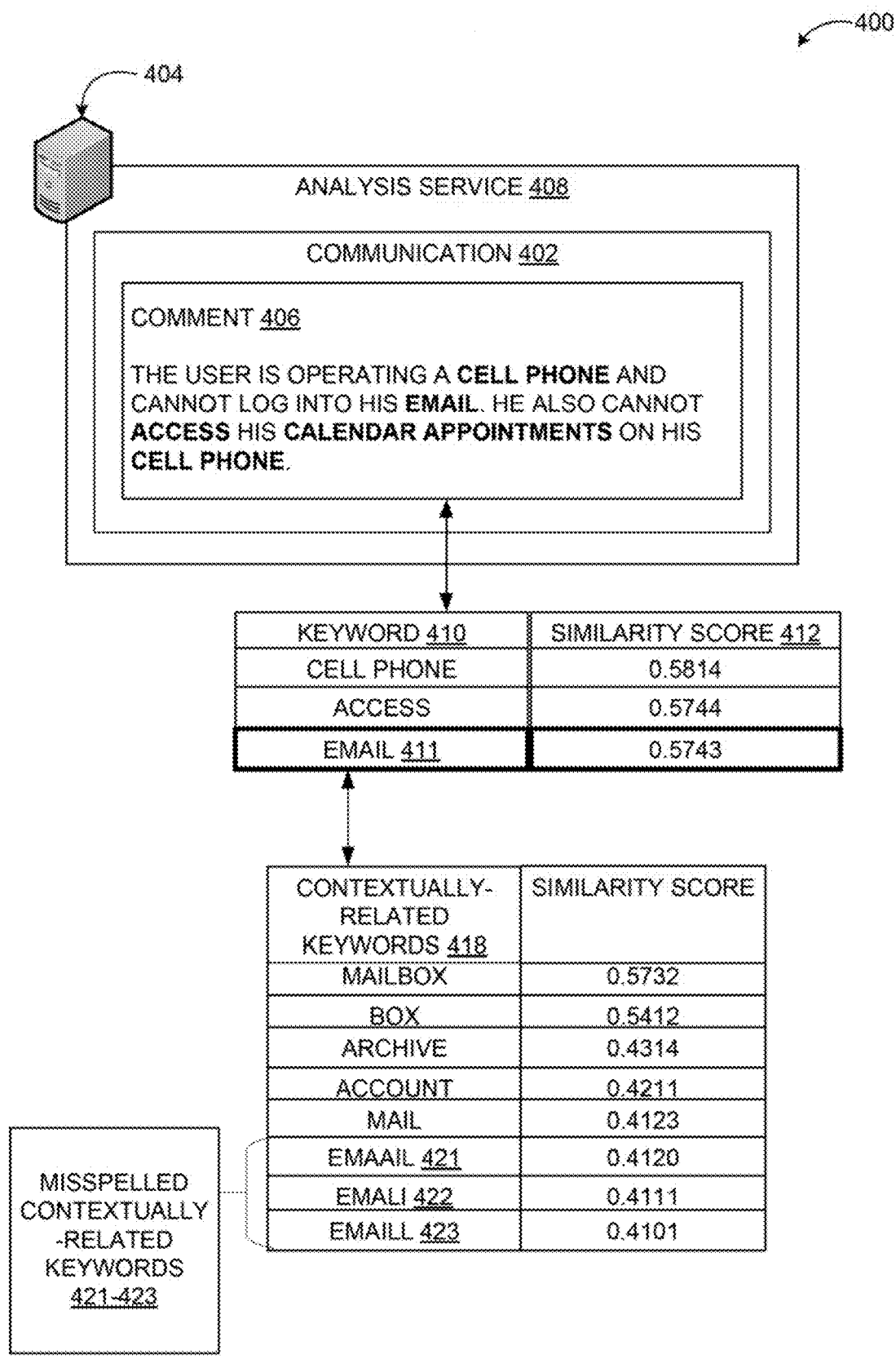
FIG. 4 is a display diagram illustrating performance of a linguistic analysis on a comment to extract keywords from the comment, identifying contextually-related keywords from the comment, and identifying misspelled keywords associated with the comment, according to embodiments.

FIG. 4 is a display diagram illustrating performance of a linguistic analysis on a comment to extract keywords from the comment, identifying contextually-related keywords from the comment, and identifying misspelled keywords associated with the comment, according to embodiments.

As shown in a diagram 400, a server 404 may execute an analysis service 408. The analysis service 408 may receive a communication 402 from a participant. The communication 402 may include a comment 406. In an example, the communication 402 may be associated with an incident. The analysis service 408 may be configured to perform a linguistic analysis on a section of the comment 406. The section of the comment 406 may include a sentence in the comment 406, a paragraph in the comment 406, and/or a participant-defined area in the comment 406, among others.

The analysis service 408 may also compute a similarity score 412 for each keyword related within the section of the comment 406 based on criteria associated with the keywords 410. The criteria associated with the keywords 410 may include a first criterion associated with a frequency of contextually-related keywords in the section of the comment 406 and/or a second criterion associated with a usage frequency in the section of the comment 406. The similarity score 412 may determine a quantitative similarity/likeness measure for the keywords 410.

In an example, the analysis service 408 may perform the linguistic analysis on the entirety of the comment 406. The analysis service 408 may compute the similarity score 412 for the keywords 410 related within the entirety the comment 406 based on the second criterion (e.g., the usage frequency in the section of the comment 406). In the example, the keyword, "cell phone," appears twice within the entirety of the comment 406. As such, he keyword, "cell phone," will have the highest similarity score 412.

In another example, the analysis service 408 may perform the linguistic analysis on the entirety of the comment 406. The analysis service 408 may compute the similarity score 412 for the keywords 410 related within the entirety the comment 406 based on the first criterion (e.g., the frequency of contextually-related keywords 418 in the section of the comment 406) using natural language processing algorithms, machine learning algorithms, and/or statistical machine learning algorithms, among others.

The analysis service 408 may identify keywords 410 that are contextually-related to the keywords, "email" 411, for example. The contextually-related keywords 418 may include the keywords, "mailbox," "box," "archive," "account," and "mail." In other examples, the analysis service 408 may identify keywords 410 that are contextually-related to the term, "mailbox." The contextually-related keywords 418 may include the keywords 410, "account," "archive," "calendar," and "user." In further examples, the analysis service 408 may identify keywords 410 that are contextually-related to the term, "delay." The contextually-related keywords 418 may include the keywords 410, "delaying," "delays," "arriving," "received," "occasional," and "held."

In some other examples, the analysis service 408 may identify keywords 410 that are contextually-related to the term, "access." The contextually-related keywords 418 may include the keywords 410, "permission," "granted," "privileges," "rights," "contribute," and "lockdown." In additional examples, the analysis service 408 may identify keywords 410 that are contextually-related to the term, "EAS." The contextually-related keywords 418 may include the keywords 410, "protocol," "information correlation," "cellular," "cell," and "mobile."

In other examples, the analysis service 408 may also analyze a history of computed similarity scores for keywords 410 contextually related to the term, "email" 411 during a previous time period using one or more machine learning algorithms. The analysis service 408 may identify the contextually-related keywords 418 during the previous time period, which may include the keywords, "mailbox," "box," "archive," and "account," may be associated within the comment 406 more often than not (e.g., six out of ten sampling times, seven out of ten sampling times, eight out of ten sampling times, etc.). The analysis service 408 may determine that the keywords, "mailbox," "archive," and "account" are related during a second time period. Additionally, the analysis service 408 may also identify misspelled contextually-related keywords 421-423 during the previous time period. The misspelled contextually-related keywords 421-423 may include the keywords such as, "emaail" 421, "emali" 422," and "emaill" 423.

The analysis service 408 may also compare the similarity score 412 for the keywords 410 to a threshold. The threshold may include a timing threshold (e.g., a twenty-four hour threshold, an hour threshold, or a ten minute threshold, etc.) and/or an urgency threshold associated with the incident. In some examples, the urgency threshold may be participant-defined (e.g., may be based on a task or appointment set by the participant). In response to detecting the similarity score 412 for a subset of the keywords 410 exceeding the threshold, the analysis service 408 may identify the communication 402 including the comment 406 and may validate an association between the communication 402 and the incident.

In other examples, the analysis service 408 may receive a request from a requesting party (e.g., the participant or a technical personnel) to modify the assignment of the communication 402 from the incident to another incident. The analysis service 408 may identify a credential associated with the requesting party and may compare the credential to a predefined rule. In some examples, the analysis service 408 may detect a match between the credential and the predefined rule and may identify the requesting party as an administrator (e.g., the technical personnel). The analysis service 408 may provide an alert to be displayed on a user experience to the requesting party to prompt the requesting party to modify the assignment of the communication 402 from the incident to the other incident. The alert may include an audio alert, a visual alert, a tactile alert, and/or a textual alert, among others. The analysis service 408 may receive the modification of the assignment from the requesting party and may execute the modification of the assignment.

In other examples, the analysis service 408 may detect a mismatch between the credential and the predefined rule and may identify the requesting party as the participant (e.g., an end-user). The analysis service 408 may then provide the alert to be displayed on the user experience to the participant to indicate a persistence of the association between the communication 402 and the incident.

In other examples, the analysis service 408 may compare the similarity score 412 for the keywords 410 to another threshold and may detect the similarity score 412 for the keywords 410 as exceeding the other threshold. The analysis service 408 may then identify the comment 406 associated with the similarity score 412 for the keywords 410 as exceeding the other threshold.

The analysis service 408 may then identify the communication 402 that includes the comment 406. In some examples, the analysis service 408 may detect a failure to validate an association between the communication 402 and the incident. In response, the analysis service 408 may analyze a history of associations of the communication 402 to the incident and other incidents during a previous time period and may assign the communication 402 to another incident based on the analysis.

In other examples, the analysis service 408 may utilize the contextually-related keywords 418 to retrain the model associated with the linguistic analysis. The analysis service 408 may allow the administrator to adjust individual similarity scores. The analysis service 408 may also allow the administrator to provide feedback and/or comments to the analysis service 408 to re-validate and/or re-train the linguistic analysis model.

Figure 5:
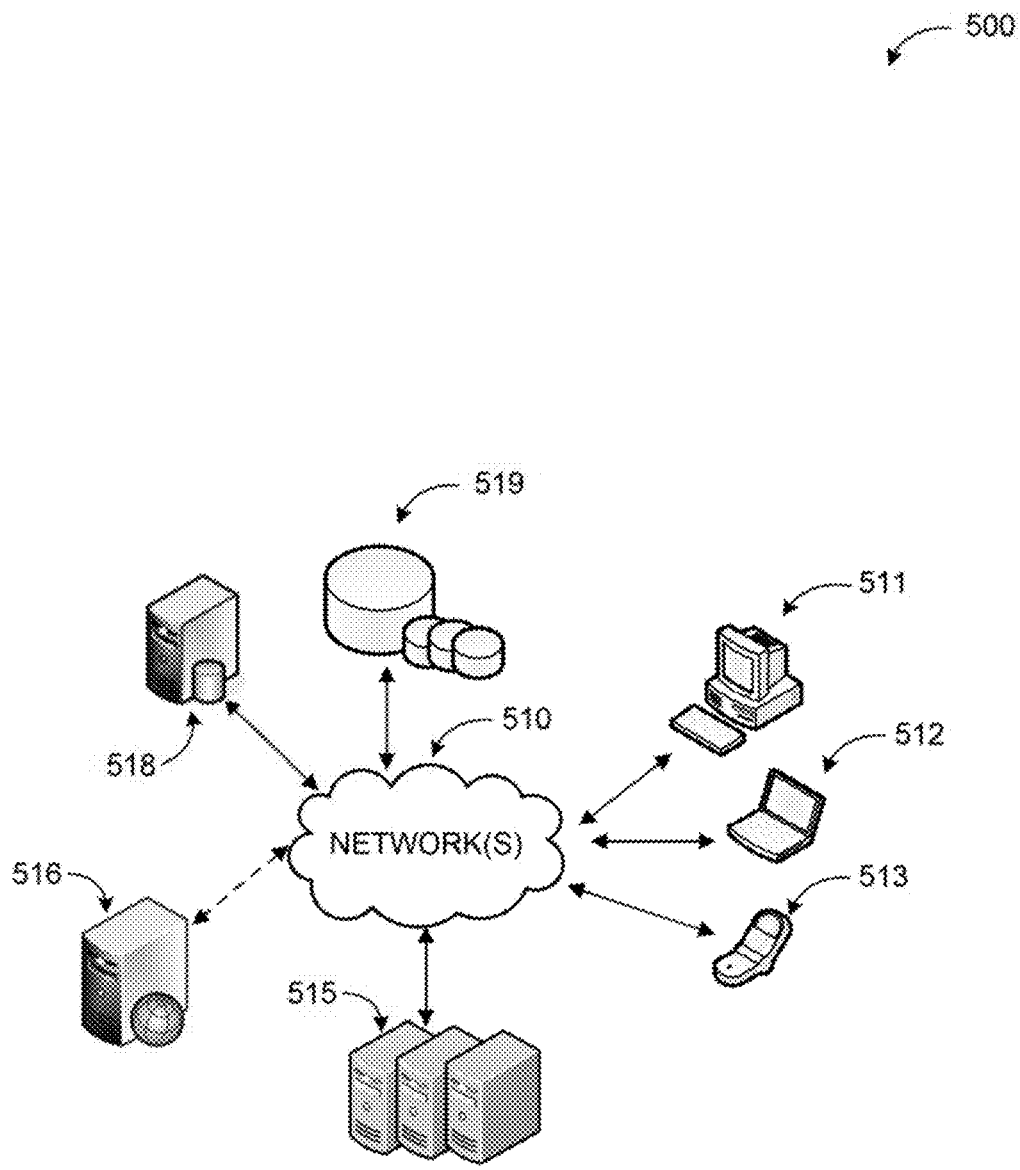
FIG. 5 is a simplified networked environment, where a system according to embodiments may be implemented.

FIG. 5 is a simplified networked environment, where a system according to embodiments may be implemented.

As shown in a diagram 500, a server include an analysis service. The analysis service may be implemented in a networked environment over one or more networks, such as a network 510. An engine or module (e.g., a processing engine or an analysis engine, for example) of the server may present configuration options on a user experience to a participant. The user experience may be a visual display associated with the analysis service through which the participant may interact with the analysis service. The interactions may include a touch input, a gesture input, a voice command, eye tracking, a gyroscopic input, a pen input, mouse input, and/or a keyboards input, among others.

The analysis service, as discussed herein, may be implemented via software executed over servers 515. The servers 515 may include one or more processing servers 516, where at least one of the one or more processing servers 516 may be configured to execute one or more applications associated with the analysis service. In other examples, the analysis service may be provided by a third party service or may include a web application. The analysis service may store data in a data store 519 directly or through a database server 518.

In examples, the servers 515 may include the analysis service. The analysis service may include a processing engine and an analysis engine. The processing engine may be configured to receive a communication associated with an incident from the participant. The participant may be associated with a computing device (e.g., a desktop computer 511, a mobile computer 512, or a smart phone 513, among other computing devices). The communication may include comments. A textual scheme, a graphical scheme, an audio scheme, an animation scheme, a coloring scheme, a highlighting scheme, and/or a shading scheme may be employed to distinguish the comments.

The analysis engine may be configured to perform a linguistic analysis on a section of the comments, compute a similarity score for each keyword related within the section of the comments based on criteria associated with the keywords, and compare the similarity score for the keywords to a threshold. In response to detecting the similarity score for a subset of the keywords exceeding the threshold, the analysis engine may be further configured to identify the communication that includes the comments and may validate an association between the communication and the incident.

The computing device may communicate with the server over a network 510. The network 510 may comprise any topology of servers, clients, Internet service providers, and communication media. A system according to embodiments may have a static or dynamic topology. The network 510 may include multiple secure networks, such as an enterprise network, an unsecure network, or the Internet. The unsecure network may include a wireless open network. The network 510 may also coordinate communication over other networks, such as Public Switched Telephone Network (PSTN) or cellular networks. Furthermore, the network 510 may include multiple short-range wireless networks, such as Bluetooth, or similar ones. The network 510 may provide communication between the nodes described herein. By way of example, and not limitation, the network 510 may include wireless media. The wireless media may include, among others, acoustic media, RF media, infrared media, and other wireless media.

Many other configurations of computing devices, applications, and systems may be employed for assigning a communication to an incident. Furthermore, the networked environments discussed in FIG. 5 are for illustration purposes only. Embodiments are not limited to the example applications, modules, or processes.

Figure 6:
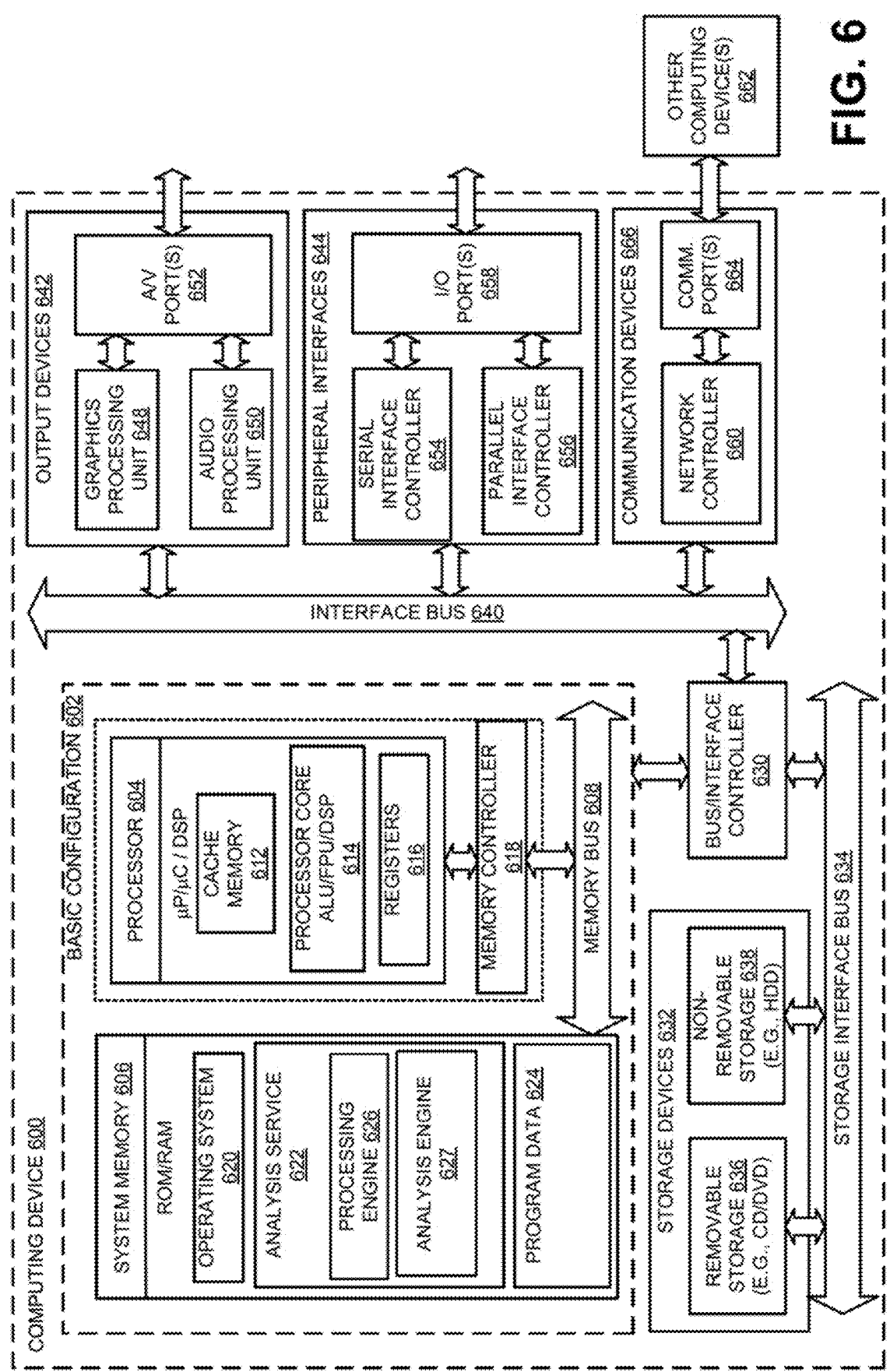
FIG. 6 is a block diagram of an example computing device, which may be used for linguistic analysis based correlation of distinct events, according to embodiments.

FIG. 6 is a block diagram of an example computing device, which may be used for linguistic analysis based correlation of distinct events, according to embodiments.

As shown in an example basic configuration 602, a computing device 600 may be used as a server, a desktop computer, a portable computer, a smart phone, a special purpose computer, or a similar device. In an example basic configuration 602, the computing device 600 may include one or more processors 604 and a system memory 606. A memory bus 608 may be used for communication between the processor 604 and the system memory 606. The example basic configuration 602 may be illustrated in FIG. 6 by those components within the inner dashed line.

Depending on the desired configuration, the processor 604 may be of any type, including but not limited to a microprocessor (µP), a microcontroller (µC), a digital signal processor (DSP), or any combination thereof. The processor 604 may include one more levels of caching, such as a level cache memory 612, one or more processor cores 614, and registers 616. The one or more processor cores 614 may (each) include an arithmetic logic unit (ALU), a floating point unit (FPU), a digital signal processing core (DSP Core), or any combination thereof. An example memory controller 618 may also be used with the processor 604, or in some implementations, the example memory controller 618 may be an internal part of the processor 604.

Depending on the desired configuration, the system memory 606 may be of any type including but not limited to volatile memory (such as RAM), non-volatile memory (such as ROM, flash memory, etc.), or any combination thereof. The system memory 606 may include an operating system 620, an analysis service 622, and a program data 624. The analysis service 622 may include a processing engine 626, and an analysis engine 627. The processing engine 626 may be configured to receive a communication associated with an incident from a participant. The communication may include comments. The analysis engine 627 may be configured to perform a linguistic analysis on a section of the one or more comments, compute a similarity score for each keyword related within the section of the comments based on criteria associated with the keywords, and compare the similarity score for the keywords to a threshold. In response to detecting the similarity score for a subset of the keywords exceeding the threshold, the analysis engine 627 may be further configured to identify the communication that includes the comments and validate an association between the communication and the incident. The program data 624 may also include, among other data, similarity score data, keyword data, association data, and other information data related to the association between the communication and the incident, or the like, as described herein.

The computing device 600 may have additional features or functionality, and additional interfaces to facilitate communications between the example basic configuration 602 and any desired devices and interfaces. For example, a bus/interface controller 630 may be used to facilitate communications between the example basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices may include magnetic disk devices, such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable, and non-removable media implemented in any method or technology for storage of information, such as computer-readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 646) to the example basic configuration 602 via the bus/interface controller 630. Some of the one or more output devices 642 include a graphics processing unit 648 and an audio processing unit 650, which may be configured to communicate to various external devices such as a display or speakers via one or more A/V ports 652. The one or more peripheral interfaces 644 may include a serial interface controller 654 or a parallel interface controller 656, which may be configured to communicate with external devices such as input devices (for example, keyboard, mouse, pen, voice input device, touch input device, etc.) or other peripheral devices (for example, printer, scanner, etc.) via one or more I/O ports 658. An example communication device 666 includes a network controller 660, which may be arranged to facilitate communications with one or more other computing devices 662 over a network communication link via one or more communication ports 664. The one or more other computing devices 662 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer, which includes any of the above functions. The computing device 600 may also be implemented as a personal computer including both laptop computer and non-laptop computer configurations.

Example embodiments may also include methods for linguistic analysis based correlation of distinct events. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 7:
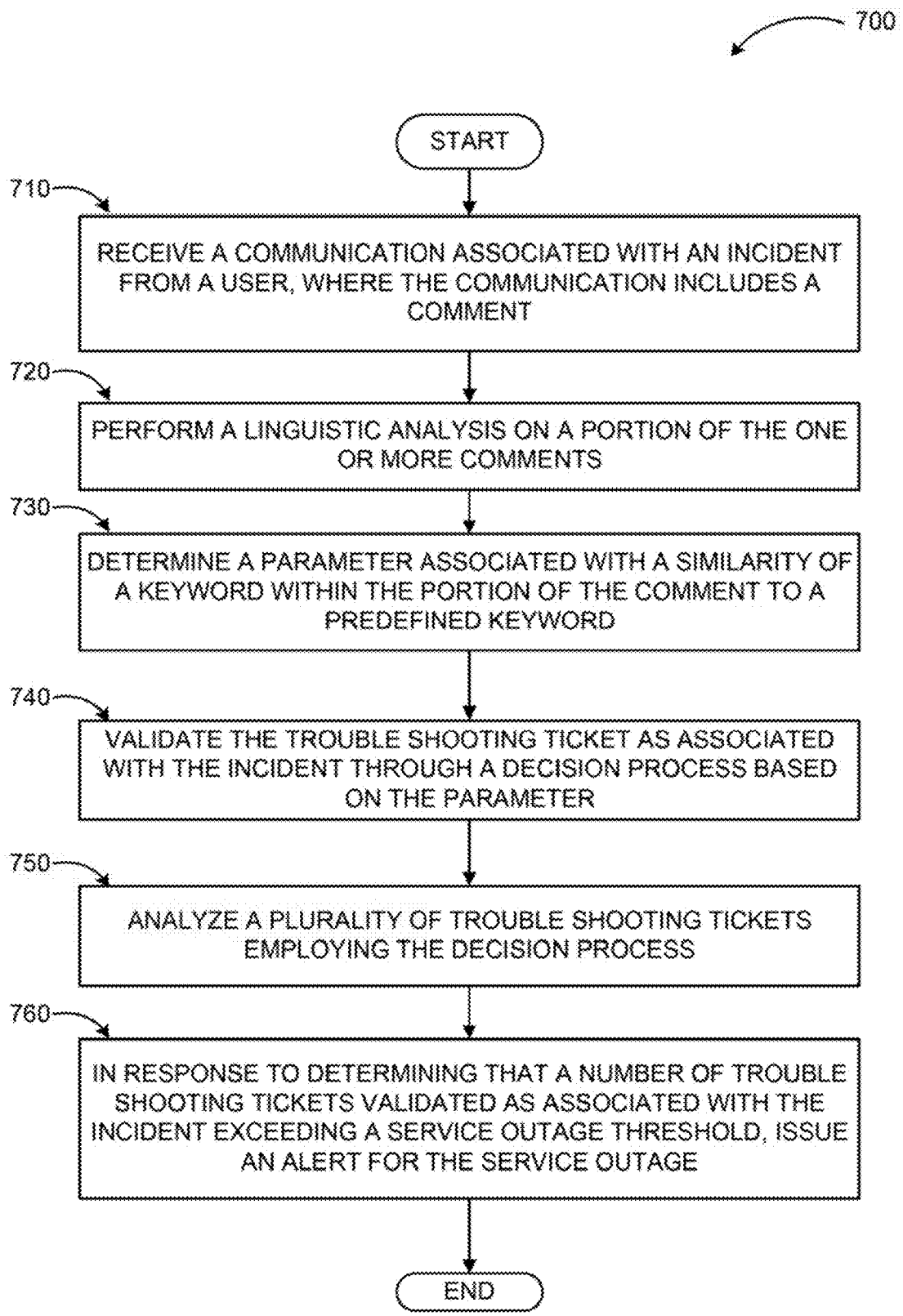
FIG. 7 is a logic flow diagram illustrating a process for linguistic analysis based correlation of distinct events, according to embodiments.

FIG. 7 is a logic flow diagram illustrating a process for linguistic analysis based correlation of distinct events, according to embodiments.

A process 700 may be implemented on a server. As described, a server may include an analysis service. The computing device 600 may communication with the server through a network. A processing engine of the analysis service may present configuration options on a user experience to the participant. The configuration options may include a modification of the communication and/or a modification of a comment associated with the communication. The user experience may be a visual display associated with the analysis service through which the participant may interact with the analysis service.

The process 700 begins with operation 710, where the processing engine may receive a communication associated with an incident from a user. The communication may be in form of an instant messaging communication, an email communication, a text message, an audio message, a video message, and/or a graphical message, among others. The communication may also include comments.

At operation 720, an analysis engine of the analysis service may perform a linguistic analysis on a section of a comment. The section may include a sentence, a paragraph, or a user-defined section of the comment.

At operation 730, the analysis engine may determine a parameter associated with a similarity of a keyword within the portion of the comment to a predefined keyword. The trouble shooting ticket may then be as associated with the incident through a decision process based on the parameter at operation 740.

The analysis engine may analyze multiple trouble shooting tickets employing the decision process at operation 750. An alert may be issued for service outage at operation 760 in response to determining that a number of trouble shooting tickets validated as associated with the incident exceeding a service outage threshold. The threshold may include a timing threshold and/or an urgency threshold associated with the incident, among others.

The operations included in process 700 are for illustration purposes. Linguistic analysis based correlation of distinct events may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to some examples, a server configured to assign a communication to an incident is described. The server may include a memory configured to store instructions and a processor coupled to the memory, the processor configured to execute an analysis service. The analysis service may include a processing engine configured to receive the communication associated with the incident, where the communication includes a comment. The analysis service may also include an analysis engine configured to perform a linguistic analysis on at least a portion of the comment; analyze a plurality of communications employing the decision process; and in response to determining that a number of communications validated as associated with the incident exceeding a service outage threshold, issue an alert for the service outage. The linguistic analysis may include determining a parameter associated with a similarity of a keyword within the portion of the comment to a predefined keyword and validating the communication as associated with the incident through a decision process based on the parameter.

According to other examples, the parameter may include one or more criteria including a first criterion associated with a frequency of contextually-related keywords in the comment and a second criterion associated with a usage frequency of the keyword in the comment, and the analyzed portion may include a sentence or a paragraph in the one or more comments. The analysis engine may be further configured to assign a first weighted value to the first criterion; assign a second weighted value to the second criterion; and compare the first weighted value to the second weighted value. The analysis engine may also be configured to detect the first weighted value as being greater than the second weighted value; and compute a similarity score for the keyword within the analyzed portion of the comment based on the first criterion associated with the keyword.

According to further examples, the analysis engine may be further configured to detect the first weighted value as being less than the second weighted value; and compute a similarity score for the keyword within the analyzed portion of the comment based on the second criterion associated with the keyword. The analysis engine may also be configured to receive a request to modify the assignment of one or more of the first weighted value to the first criterion and the second weighted value to the second criterion; identify a credential associated with a requesting party; and compare the credential to a predefined rule. The analysis engine may be further configured to detect a match between the credential and the predefined rule; identify the requesting party as an administrator; and provide an alert to be displayed on a user experience to the requesting party to prompt the requesting party to modify the assignment associated with one or more of the first weighted value and the second weighted value.

According to yet other examples, the analysis engine may be further configured to receive the modification of the assignment from the requesting party and execute modification of the assignment. The decision process may include comparison of the similarity score for the keywords to a validation threshold and detection of the similarity score for the keyword as exceeding the validation threshold. The analysis engine may be further configured to identify the communication that includes the comment; detect a failure to validate an association between the communication and the incident; analyze a history of associations of the communication to the incident and other incidents during a previous time period; and assign the communication to another incident based on the analysis.

According to other examples, a method to detect a service outage is described. The method may include receiving a trouble shooting ticket associated with an incident, where the trouble shooting ticket includes a comment; performing a linguistic analysis on a portion of the comment, where the linguistic analysis includes determining a parameter associated with a similarity of a keyword within the portion of the comment to a predefined keyword, and validating the trouble shooting ticket as associated with the incident through a decision process based on the parameter; analyzing a plurality of trouble shooting tickets employing the decision process; and in response to determining that a number of trouble shooting tickets validated as associated with the incident exceeding a service outage threshold, issuing an alert for the service outage.

According to some examples, employing the decision process may include computing a similarity score for the keyword within the portion of the comment based on one or more criteria for comparing the keyword to the predefined keyword; and comparing the similarity score for the keyword to a validation threshold. The method may further include selecting the plurality of trouble shooting tickets based on a predefined time period. The method may also include in response to determining that the number of trouble tickets validated as being associated with the incident does not exceed the service outage threshold, adjusting the time period; and analyzing another plurality of trouble shooting tickets based on the adjusted time period. The method may also include receiving a feedback associated with the validation; and adjusting a linguistic model used for the linguistic analysis based on the feedback. The threshold may be a timing threshold or an urgency threshold associated with the incident.

According to further examples, a computer-readable memory device with instructions stored thereon to detect a service outage is described. The instructions may include receiving a trouble shooting ticket associated with an incident, where the trouble shooting ticket includes a comment; performing a linguistic analysis on a portion of the comment, where the linguistic analysis includes determining a parameter associated with a similarity of a keyword within the portion of the comment to a predefined keyword by computing a similarity score for the keyword within the portion of the comment based on one or more criteria for comparing the keyword to the predefined keyword and validating the trouble shooting ticket as associated with the incident based on the parameter by comparing the similarity score for the keyword to a validation threshold; and in response to determining that a number of trouble shooting tickets validated as associated with the incident exceeding a service outage threshold, issuing an alert for the service outage.

According to some examples, the comment may be in form of an instant messaging communication, an email communication, a text message, an audio message, a video message, or a graphical message. The instructions may further include assigning a first weighted value to a first criterion of the one or more criteria; assigning a second weighted value to a second criterion of the one or more criteria; comparing the first weighted value to the second weighted value; detecting the first weighted value as being greater than the second weighted value; and computing the similarity score for the keyword based on the first criterion. The instructions may also include filtering the plurality of trouble shooting tickets based on one or more of a geographical region, a datacenter, and a hosted service.

According to other examples, a means for detecting a service outage is described. The means may include a means for receiving a trouble shooting ticket associated with an incident, where the trouble shooting ticket includes a comment; a means for performing a linguistic analysis on a portion of the comment, where the linguistic analysis includes determining a parameter associated with a similarity of a keyword within the portion of the comment to a predefined keyword and validating the trouble shooting ticket as associated with the incident through a decision process based on the parameter; a means for analyzing a plurality of trouble shooting tickets employing the decision process; and in response to determining that a number of trouble shooting tickets validated as associated with the incident exceeding a service outage threshold, a means for issuing an alert for the service outage.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to detect a service outage, the method comprising:
   monitoring incoming and outgoing communications associated with one or more incidents, wherein the incoming and outgoing communications include communications between a user and a technical support personnel or communications between two technical support personnel;
   performing a linguistic analysis on at least a portion of each communication such that differently worded comments associated with a same incident are determined as being associated with the same incident based on a determination of a similarity of a keyword within each communication to a predefined keyword, wherein a linguistic model used for the linguistic analysis is trained based on the monitored incoming and outgoing communications;
   receiving one or more parameters associated with a service outage alert, wherein the one or more parameters include a service outage threshold, a service outage threshold timing, and an alert recipient; and
   in response to determining that a number of the monitored incoming and outgoing communications determined as being associated with the same incident exceed the service outage threshold, issuing the service outage alert based on the one or more parameters.

2. The method of claim 1, further comprising:
   selecting the monitored incoming and outgoing communications based on a predefined time period.

3. The method of claim 2, further comprising:
   in response to determining that the number of the monitored incoming and outgoing communications determined as being associated with the same incident does not exceed the service outage threshold, adjusting the time period; and
   analyzing another plurality of the monitored incoming and outgoing communications based on the adjusted time period.

4. The method of claim 1, wherein the service outage threshold is a timing threshold or an urgency threshold associated with the incident.

5. The method of claim 1, further comprising:
   filtering the monitored incoming and outgoing communications based on one or more of a geographical region, a datacenter, and a hosted service.

6. The method of claim 1, further comprising:
   detecting a failure to associate a communication with the incident;
   analyze a history of associations of the communication with the incident and other incidents during a previous time period; and
   assign the communication to another incident based on the analysis.

7. The method of claim 1, further comprising:
   associating a communication with an incident based on performing the linguistic analysis on an initial portion of the communication; and
   providing one or more potential solutions to an author of the communication based on the performed linguistic analysis.

8. The method of claim 1, further comprising:
   associating a communication with an incident based on performing the linguistic analysis on an initial portion of the communication; and
   issuing an alert to a technical support personnel based on the performed linguistic analysis on the initial portion of the communication.

9. A server configured to detect a service outage, the server comprising:
   a memory configured to store instructions;
   a processor coupled to the memory, the processor configured to:
     monitor incoming and outgoing communications associated with one or more incidents, wherein the incoming and outgoing communications include communications between a user and a technical support personnel or communications between two technical support personnel;
     perform a linguistic analysis on at least a portion of each communication such that differently worded comments associated with a same incident are determined as being associated with the same incident based on a determination of a similarity of a keyword within each communication to a predefined keyword, wherein a linguistic model used for the linguistic analysis is trained based on the monitored incoming and outgoing communications; and
     in response to determining that a number of the monitored incoming and outgoing communications determined as being associated with the same incident exceed a service outage threshold, issue an alert for the service outage.

10. The server of claim 9, wherein the monitored incoming and outgoing communications comprise an instant messaging communication, an email communication, a text message, an audio message, a video message, or a graphical message.

11. The server of claim 9, wherein the processor is further configured to:
   receive a request to modify an assignment of a monitored communication from an incident to another incident; and
   in response to detecting a match between a credential associated with a requesting party and a predefined rule, provide an alert to be displayed on a user experience to the requesting party to prompt the requesting party to modify the assignment of the monitored communication from the incident to the other incident.

12. The server of claim 9, wherein the processor is configured to perform the linguistic analysis based on:
   determination of a first criterion associated with a frequency of contextually-related keywords in a monitored communication;
   determination of a second criterion associated with a usage frequency of the keyword in the monitored communication; and
   assignment of the monitored communication to an incident based on the first criterion and the second criterion.

13. The server of claim 12, wherein the first criterion and the second criterion are applied to word within a single sentence or a single paragraph in the monitored communication.

14. The server of claim 12, wherein the processor is further configured to perform the linguistic analysis based on:
   assignment of a first weighted value to the first criterion;
   assignment of a second weighted value to the second criterion; and
   comparison of the first weighted value to the second weighted value.

15. The server of claim 14, wherein the processor is further configured to:
   upon detection of the first weighted value being greater than the second weighted value, compute a similarity score for the keyword within the analyzed portion of the monitored communication based on the first criterion associated with the keyword.

16. The server of claim 14, wherein the processor is further configured to:
   upon detection of the first weighted value being less than the second weighted value, compute a similarity score for the keyword within the analyzed portion of the monitored communication based on the second criterion associated with the keyword.

17. The server of claim 9, wherein the processor is further configured to:
   compare a similarity score for one or more keywords to a validation threshold; and
   assign the monitored communication to an incident based on detection of the similarity score for the one or more keywords as exceeding the validation threshold.

18. A computer-readable memory device with instructions stored thereon to detect a service outage, the instructions comprising:
   monitoring troubleshooting tickets associated with one or more incidents, wherein the monitored troubleshooting tickets include an instant messaging communication, an email communication, a text message, an audio message, a video message, or a graphical message between a user and a technical support personnel or between two technical support personnel;
   performing a linguistic analysis on at least a portion of each troubleshooting ticket such that differently worded comments associated with a same incident are determined as being associated with the same incident based on a determination of a similarity of a keyword within each troubleshooting ticket to a predefined keyword, wherein a linguistic model used for the linguistic analysis is trained based on the monitored troubleshooting tickets; and
   in response to determining that a number of the monitored troubleshooting tickets determined as being associated with the same incident exceed a service outage threshold, issuing an alert for the service outage.

19. The computer-readable memory device of claim 18, wherein the incident is one or more of an event that causes an interruption or a reduction in quality of a product or a service, a failure or an error associated with a software infrastructure, a failure or an error associated with a network, a failure or an error associated with a hardware, or a failure or an error associated with a software.

20. The computer-readable memory device of claim 18, wherein the linguistic analysis is performed on a comment included in the troubleshooting ticket.

* * * * *